US012649496B2

(12) United States Patent
Chae et al.

(10) Patent No.: US 12,649,496 B2
(45) Date of Patent: Jun. 9, 2026

(54) AUTONOMOUS DRIVING CONTROL APPARATUS AND METHOD OF CONTROLLING SPEED DURING TRANSITION TO MANUAL DRIVING

(71) Applicants:Hyundai Motor Company, Seoul (KR); Kia Corporation, Seoul (KR)

(72) Inventors: Su Hong Chae, Hwaseong (KR); Ji Hwan Park, Seoul (KR); Young Jin Sung, Seoul (KR); Chan Hee Jung, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 366 days.

(21) Appl. No.: 18/123,502

(22) Filed: Mar. 20, 2023

(65) Prior Publication Data

US 2024/0017750 A1 Jan. 18, 2024

(30) Foreign Application Priority Data

Jul. 15, 2022 (KR) ......................... 10-2022-0087672

(51) Int. Cl.
*B60W 60/00* (2020.01)
(52) U.S. Cl.
CPC .. *B60W 60/0053* (2020.02); *B60W 60/00186* (2020.02); *B60W 2552/00* (2020.02); *B60W 2555/20* (2020.02); *B60W 2555/60* (2020.02); *B60W 2720/10* (2013.01)
(58) Field of Classification Search
CPC ....... B60W 60/0053; B60W 60/00186; B60W 2552/00; B60W 2555/20; B60W 2555/60;

B60W 2720/10; B60W 60/0057; B60W 60/005; B60W 30/08; B60W 30/146; B60W 30/181; B60W 40/02; B60W 50/0205; B60W 60/001; B60W 2050/0005; B60W 2050/0072; B60W 2050/021;

(Continued)

(56) References Cited

U.S. PATENT DOCUMENTS

| | | | |
|---|---|---|---|
| 10,795,357 B2 | 10/2020 | Feng et al. | |
| 10,832,576 B2 | 11/2020 | Hiramatsu et al. | |
| 2019/0185004 A1* | 6/2019 | Kim ................ | B60W 50/0097 |

(Continued)

FOREIGN PATENT DOCUMENTS

| | | |
|---|---|---|
| KR | 2019-0003657 A | 1/2019 |
| KR | 2021-0134125 A | 11/2021 |

*Primary Examiner* — James J Lee
*Assistant Examiner* — Alexander George Matta
(74) *Attorney, Agent, or Firm* — Fox Rothschild LLP

(57) ABSTRACT

An autonomous driving control apparatus for transitioning control authority of an autonomous vehicle and a method thereof may include a processor provided in the autonomous vehicle configured to determine whether a predetermined condition required to transition to a manual driving mode while the autonomous vehicle may be traveling in an autonomous driving mode is met, determine a speed limit of the autonomous vehicle, and/or output a transition demand (TD) to a driver of the autonomous vehicle, and control autonomous driving such that a speed of the autonomous vehicle may not be greater than the speed limit while the TD is output. The autonomous driving control apparatus may be configured to include a time taken to transition control authority to the driver, thus improving safety.

16 Claims, 6 Drawing Sheets

301

OUTPUT TRANSITION
DEMAND (TD)
(303)

POINT WHERE IT IS IMPOSSIBLE
TO OPERATE AUTONOMOUS DRIVING
(302)

(58) Field of Classification Search
CPC ......... B60W 2520/10; B60W 2530/18; B60W 2554/4042
See application file for complete search history.

(56)     References Cited

U.S. PATENT DOCUMENTS

| | | | |
|---|---|---|---|
| 2019/0227546 A1* | 7/2019 | Sato ..................... | G05D 1/0061 |
| 2019/0295417 A1 | 9/2019 | Hiramatsu et al. | |
| 2020/0064833 A1* | 2/2020 | Fox ................... | B60W 60/0057 |
| 2020/0098258 A1* | 3/2020 | Morris .............. | G01C 21/3889 |
| 2020/0180660 A1* | 6/2020 | Honda ................. | B60W 50/08 |
| 2021/0339774 A1 | 11/2021 | Kim et al. | |
| 2022/0105930 A1* | 4/2022 | Kurakami ......... | B60W 50/0097 |
| 2022/0340175 A1* | 10/2022 | Strehle ................ | B60W 30/02 |
| 2023/0391327 A1* | 12/2023 | Heirung ............. | B60W 30/143 |

* cited by examiner

| Automation Level | SAE Classification Criteria | System Role | Driver Role |
|---|---|---|---|
| LEVEL 0 | No Automation | Provide only temporary emergency intervention or warning | The driver does all the driving. |
| LEVEL 1 | Driver Assistance | Perform some driving functions such as steering and acceleration/deceleration together under the riding of the driver who is performing the driving function in the normal operating section | The driver determines whether/when the level 1 system operates and does the rest of the driving except for steering wheel or accelerator/decelerator pedal control (including driving environment/vehicle operation/level 1 system monitoring and immediate emergency preparedness). |
| LEVEL 2 | Partial Automation | Perform driving functions such as steering and acceleration/deceleration under the riding of the driver who is monitoring the steering and acceleration/deceleration devices on behalf of the driver | The driver determines whether/when the system operates and does the rest of the driving except for steering wheel or accelerator/decelerator pedal control (including driving environment/vehicle operation /level 2 system monitoring and immediate emergency preparedness). |
| LEVEL 3 | Conditional Automation | Hand over driving control authority to the driver and perform driving functions such as steering and acceleration/deceleration, in situations other than the conditions | The driver determines whether/when the system operates and does the rest of the driving except for steering wheel or accelerator/decelerator pedal control and driving environment monitoring (should take over the control authority of the level 3 system and perform emergency preparedness, when requesting to hand over the control authority of the level 3 system). |
| LEVEL 4 | High Automation | In extremely exceptional circumstances, the system performs all driving functions under the riding of the driver. | It is able to selectively perform emergency preparedness, when requesting to hand over the control authority of the level 4 system. |
| LEVEL 5 | Full Automation | Perform the fully driving function capable of responding to any situation without the driver | The driver only determines whether the system operates and does not perform all the driving. |

FIG.1

AUTONOMOUS DRIVING CONTROL APPARATUS AND METHOD OF CONTROLLING SPEED DURING TRANSITION TO MANUAL DRIVING

CROSS-REFERENCE TO RELATED APPLICATION

This application claims under 35 U. S. C. § 119(a) the benefit of priority to Korean Patent Application No. 10-2022-0087672, filed in the Korean Intellectual Property Office on Jul. 15, 2022, the entire contents of which are incorporated herein by reference.

TECHNICAL FIELD

The present disclosure relates to an autonomous driving control apparatus and a method thereof, and more particularly, relates to an autonomous driving control apparatus for transitioning control authority of an autonomous vehicle and a method thereof.

BACKGROUND

An autonomous vehicle needs a capability of adaptively coping with a surrounding situation which changes in real time while driving. First of all, a reliable determination control function may be required to mass produce and enable autonomous vehicles. A semi-autonomous vehicle recently on the market basically performs driving, braking, and steering on behalf of a driver to reduce fatigue of the driver. Unlike fully autonomous driving, semi-autonomous driving should allow the driver to keep focusing on the driving, for example, should allow the driver to continue holding the steering wheel. Recently, the semi-autonomous vehicle may be loaded with a highway driving assist (HDA) function, a driver status warning (DSW) function of determining driver carelessness, such as drowsy driving or gaze departure, and state abnormality and outputting a warning alarm through a cluster or the like, a driver awareness warning (DAW) function of determining whether the vehicle crosses the line and performs unstable driving by means of a front view camera, a forward collision-avoidance assist (FCA) or active emergency brake system (AEBS) function of performing emergency braking when detecting a head on collision, or the like to be sold.

After outputting a transition demand (TD) from an existing autonomous driving system of the autonomous vehicle to a driver, when the driver does not take over control authority during a specific time, the existing autonomous driving system automatically performs a minimum risk maneuver (MRM). Because it may be difficult to ensure a sufficient time necessary to transition control authority to a driver when a sudden situation occurs during autonomous driving, the driver may be in a dangerous situation. Thus, there may be a need to develop a technology where a maximum speed of an autonomous vehicle may be limited while a TD may be output.

SUMMARY

The present disclosure has been made to solve the above-mentioned problems occurring in the existing technologies while advantages achieved by the existing technologies may be maintained intact.

An embodiment of the present disclosure provides an autonomous driving control apparatus for transitioning control authority of an autonomous vehicle and a method thereof.

Another embodiment of the present disclosure provides an autonomous driving control apparatus for sufficiently ensuring a time taken to transition control authority to a driver to improve safety and a method thereof.

Another embodiment of the present disclosure provides an autonomous driving control apparatus for performing a minimum risk maneuver (MRM) to stop the vehicle, when the time taken to transition the control authority to the driver may not be sufficiently ensured to secure autonomous driving safety and a method thereof.

Another embodiment of the present disclosure provides an autonomous driving control apparatus for setting a speed limit suitable for a driving situation and sufficiently ensuring a time taken to transition control authority to the driver and a method thereof.

Another embodiment of the present disclosure provides an autonomous driving control apparatus for improving the safety and convenience of an autonomous driving system and a method thereof.

The technical problems to be solved by the present disclosure may not be limited to the aforementioned problems, and any other technical problems not mentioned herein will be clearly understood from the following description by those skilled in the art to which the present disclosure pertains.

According to an embodiment of the present disclosure, an autonomous driving control apparatus may include a processor provided in an autonomous vehicle and a memory storing instructions executable by the processor. The processor may determine whether a predetermined condition required to transition to a manual driving mode while the autonomous vehicle may be traveling in an autonomous driving mode may be met, may determine a speed limit of the autonomous vehicle, may output a transition demand (TD) to a driver of the autonomous vehicle, when the predetermined condition may be met, and may control autonomous driving such that a speed of the autonomous vehicle may not be greater than the speed limit while the TD may be output.

In an embodiment, the processor may determine the speed limit, based on a maximum speed limit corresponding to a road where the autonomous vehicle may be traveling.

In an embodiment, the processor may determine the speed limit, based on a target speed received from the driver.

In an embodiment, the processor may calculate an average speed of the autonomous vehicle during a specific time and may determine the speed limit, based on the calculated average speed.

In an embodiment, the processor may detect a specific event point in front of the autonomous vehicle and may determine that the predetermined condition may be met, when the autonomous vehicle arrives at a point spaced apart from the specific event point at a specific distance.

In an embodiment, the processor may calculate a distance, which may be obtained by adding a predetermined margin to a distance needed until the autonomous vehicle may be stopped by means of a minimum risk maneuver (MRM) after the autonomous vehicle travels at the calculated average speed during a predetermined specific time, as the specific distance.

In an embodiment, the processor may determine a speed, which may be obtained by adding a specific margin to a recommended minimum speed or a minimum speed limit corresponding to a road where the autonomous vehicle may be traveling, as the speed limit, when the calculated average speed may be lower than the recommended minimum speed or the minimum speed limit.

In an embodiment, the processor may determine the speed limit as a speed higher than the calculated average speed, with regard to a predetermined minimum unit.

In an embodiment, the processor may calculate the speed limit as a speed at which a speed deviation of the autonomous vehicle may be predicted to be lowest in a process where the autonomous driving may be performed while the TD may be output.

In an embodiment, the processor may detect a current weather state or a state of a road where the autonomous vehicle may be traveling and may calculate the speed limit, based on an experience model according to the detected weather state or the detected state of the road.

In an embodiment, the processor may determine whether a breakdown in the autonomous vehicle occurs and may calculate the speed limit, based on an experience model according to a breakdown situation of the autonomous vehicle, when it may be determined that the breakdown in the autonomous vehicle occurs.

In an embodiment, the autonomous driving control apparatus may further include a sensor device provided in the autonomous vehicle to sense a speed of a surrounding vehicle. The processor may calculate an average speed of the surrounding vehicle during a specific time, based on the speed of the surrounding vehicle, may determine whether the speed limit may be lower than the calculated average speed of the surrounding vehicle over a specific reference value, and may fail to output the TD to the driver of the autonomous vehicle and may perform an MRM, when it may be determined that the speed limit may be lower than the calculated average speed of the surrounding vehicle over the specific reference value.

According to another embodiment of the present disclosure, an autonomous driving control method may include determining, by a processor provided in an autonomous vehicle, whether a predetermined condition required to transition to a manual driving mode while the autonomous vehicle may be traveling in an autonomous driving mode may be met, determining, by the processor, a speed limit of the autonomous vehicle, outputting, by the processor, a TD to a driver of the autonomous vehicle, when the predetermined condition may be met, and controlling, by the processor, autonomous driving such that a speed of the autonomous vehicle may not be greater than the speed limit while the TD may be output.

In an embodiment, the determining of the speed limit of the autonomous vehicle by the processor may include calculating, by the processor, an average speed of the autonomous vehicle during a specific time and determining, by the processor, the speed limit, based on the calculated average speed.

In an embodiment, the determining of whether the predetermined condition may be met by the processor may include detecting, by the processor, a specific event point in front of the autonomous vehicle and determining, by the processor, that the predetermined condition may be met, when the autonomous vehicle arrives at a point spaced apart from the specific event point at a specific distance.

In an embodiment, the determining that the predetermined condition may be met, when the autonomous vehicle arrives at the point spaced apart from the specific event point at the specific distance by the processor may include calculating, by the processor, a distance, which may be obtained by adding a predetermined margin to a distance needed until the autonomous vehicle may be stopped by means of an MRM after the autonomous vehicle travels at the calculated average speed during a predetermined specific time, as the specific distance.

In an embodiment, the determining of the speed limit of the autonomous vehicle by the processor may include determining, by the processor, a speed, which may be obtained by adding a specific margin to a recommended minimum speed or a minimum speed limit corresponding to a road where the autonomous vehicle may be traveling, as the speed limit, when the calculated average speed may be lower than the recommended minimum speed or the minimum speed limit.

In an embodiment, the determining of the speed limit of the autonomous vehicle by the processor may include detecting, by the processor, a current weather state or a state of a road where the autonomous vehicle may be traveling and calculating, by the processor, the speed limit, based on an experience model according to the detected weather state or the detected state of the road.

In an embodiment, the determining of the speed limit of the autonomous vehicle by the processor may include determining, by the processor, whether a breakdown in the autonomous vehicle occurs and calculating, by the processor, the speed limit, based on an experience model according to a breakdown situation of the autonomous vehicle, when it may be determined that the breakdown in the autonomous vehicle occurs.

In an embodiment, the autonomous driving control method may further include sensing, a sensor device provided in the autonomous vehicle, a speed of a surrounding vehicle, calculating, by the processor, an average speed of the surrounding vehicle during a specific time, based on the speed of the surrounding vehicle, determining, by the processor, whether the speed limit may be lower than the calculated average speed of the surrounding vehicle over a specific reference value, and not outputting, by the processor, the TD to the driver of the autonomous vehicle and performing, by the processor, an MRM, when it may be determined that the speed limit may be lower than the calculated average speed of the surrounding vehicle over the specific reference value.

BRIEF DESCRIPTION OF THE DRAWINGS

The above and other objects, features and advantages of the present disclosure will be more apparent from the following detailed description taken in conjunction with the accompanying drawings:

FIG. 1 is a table where an automation level of an autonomous vehicle is defined.

DETAILED DESCRIPTION

Figure 2:
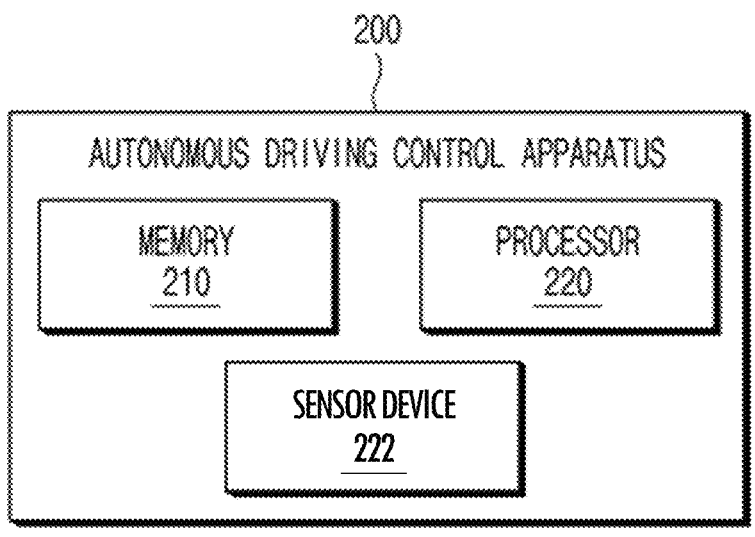
FIG. 2 is a block diagram illustrating an autonomous driving control apparatus according to an embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Hereinafter, some embodiments of the present disclosure will be described in detail with reference to the exemplary drawings. In the drawings, the same reference numerals will be used throughout to designate the same or equivalent elements. In addition, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms may be only used to distinguish one element from another element, but do not limit the corresponding elements irrespective of the order or priority of the corresponding elements. Furthermore, unless otherwise defined, all terms including technical and scientific terms used herein may be to be interpreted as may be customary in the art to which the present disclosure belongs. Such terms as those defined in a generally used dictionary may be to be interpreted as having meanings equal to the contextual meanings in the relevant field of art, and may not be to be interpreted as having ideal or excessively formal meanings unless clearly defined as having such in the present application.

Hereinafter, embodiments of the present disclosure will be described in detail with reference to FIGS. 1 to 6.

FIG. 1 is a table where an automation level of an autonomous vehicle may be defined.

An autonomous vehicle refers to a vehicle which recognizes a driving environment by itself to determine risk, controls its driving route to minimize driving manipulation of a driver, and drives itself.

Finally, the autonomous vehicle refers to a vehicle capable of performing driving, steering, and parking without influence of persons and may be focused on a vehicle where an autonomous driving technology, which may be the core foundation of the autonomous vehicle, that is, a capability of operating the vehicle without active control or monitoring of the driver may be developed to the highest degree.

Referring to FIG. 1, the driving environment may be monitored by the driver in automation levels LEVELs 0 to 2. On the other hand, the driving environment may be monitored by the automated driving system in automation levels LEVELs 3 to 5.

However, the concept of autonomous vehicles currently on the market may include an intermediate automation level to a fully autonomous vehicle and may correspond to a goal-oriented concept premised on the mass production and commercialization of fully autonomous vehicles.

An autonomous driving control method according to an exemplary embodiment of the present disclosure may be applicable to an autonomous vehicle corresponding to LEVEL 3 (conditional automation) in autonomous driving automation levels shown in FIG. 1, but may not be necessarily limited thereto, and may be applicable to an autonomous vehicle supporting a plurality of various automation levels.

An automation level of the autonomous vehicle may be classified as shown in a table of FIG. 1 based on the society of automotive engineers (SAE).

FIG. 2 is a block diagram illustrating an autonomous driving control apparatus according to an embodiment of the present disclosure;

An autonomous driving control apparatus 200 according to an embodiment of the present disclosure may be implemented inside or outside a vehicle. In this case, the autonomous driving control apparatus 200 may be integrally configured with control units in the vehicle or may be implemented as a separate hardware device to be connected with the control units of the vehicle by a connection means.

As an example, the autonomous driving control apparatus 200 may be integrally configured with the vehicle or may be implemented as a separate configuration independent of the vehicle in the form of being installed/attached to the vehicle. Alternatively, a part of the autonomous driving control apparatus 200 may be integrally configured with the vehicle and the other may be implemented as a separate configuration independent of the vehicle in the form of being installed/attached to the vehicle.

Referring to FIG. 2, the autonomous driving control apparatus 200 may include a memory 210 and a processor 220.

The memory 210 and the processor 220 may be included in a controller or an autonomous driving controller of the autonomous vehicle.

The processor 220 may perform data processing and/or calculation described below. Furthermore, the memory 210 may store data or an algorithm required in a process where the processor 220 performs data processing and/or calculation.

The memory 210 may store instructions executed by the processor 220.

The processor 220 may be an electric circuit which executes a command of software. For example, the processor 220 may be an electronic control unit (ECU), a micro controller unit (MCU), or another sub-controller.

The memory 210 may include at least one type of storage medium such as a flash memory type memory, a hard disk type memory, a micro type memory, a card type memory (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic RAM (MRAM), a magnetic disk, or an optical disk.

The processor 220 may be configured to perform the overall control such that respective components may normally perform their own functions. Such a processor 220 may be implemented in the form of hardware, may be implemented in the form of software, or may be implemented in the form of a combination thereof. Preferably, the processor 220 may be implemented as, but not limited to, a microprocessor. In addition, the processor 220 may perform a variety of data processing, calculation, and the like described below.

The processor 220 may be configured to determine a speed limit of the autonomous vehicle.

As an example, the processor 220 may be configured to determine a speed limit of the autonomous vehicle in real time during autonomous driving of the autonomous vehicle.

As an example, the processor 220 may be configured to determine a speed limit based on a maximum speed limit corresponding to a road where the autonomous vehicle may be traveling.

In this case, illustratively, the processor 220 may be configured to obtain a current position of the autonomous vehicle by means of a global positioning system (GPS) or the like.

The processor 220 may be configured to identify a road where the autonomous vehicle may be currently traveling, based on the obtained current position of the autonomous vehicle and navigation map information.

Furthermore, the processor 220 may be configured to obtain information about a maximum speed limit of the road where the autonomous vehicle may be currently traveling, based on the navigation map information.

As an example, the processor 220 may be configured to determine a maximum speed limit, corresponding to the road where the autonomous vehicle may be traveling, as a speed limit of the autonomous vehicle.

As an example, the processor 220 may be configured to determine a speed limit, based on a target speed received from a driver.

Although not illustrated, the autonomous driving control apparatus 200 may further include an input module (not shown) that is configured to receive a target speed from the driver.

The input module (not shown) may be configured to generate a control signal according to an input from the outside. To this end, the input module (not shown) may be configured as an input device such as a keypad, a touch pad, or a touch screen. When the input module (not shown) may be configured as the touch screen, it may perform a function of an output module together.

As an example, the input module (not shown) may be implemented through the audio, video, navigation (AVN) of the autonomous vehicle.

As an example, the processor 220 may be configured to determine a target speed received from the driver as a speed limit of the autonomous vehicle.

As an example, the processor 220 may be configured to calculate an average speed of the autonomous vehicle during a specific time and may determine a speed limit, based on the calculated average speed.

As an example, the processor 220 may be configured to calculate an average speed during a recent specific time in real time or depending on a predetermined period.

As an example, the processor 220 may be configured to determine the calculated average speed or a speed, which may be obtained by adding a specific margin to the calculated average speed, as a speed limit.

Herein, although the speed, which may be obtained by adding the specific margin to the calculated average speed, may be determined as the speed limit, the specific margin may be determined to the extent that it may be determined that the flow of surrounding vehicles may not be obstructed. That the flow of surrounding vehicles may be obstructed may mean that a driving speed of a host vehicle may be excessively lower or higher than speeds of the surrounding vehicles.

A recommended minimum speed or a minimum speed limit corresponding to a road where the autonomous vehicle may be traveling may be set. The recommended minimum speed or the minimum speed limit may be set for the smooth flow of the road.

As an example, when the calculated average speed may be lower than the recommended minimum speed or the minimum speed limit corresponding to the road where the autonomous vehicle may be traveling, the processor 220 may be configured to determine a speed, which may be obtained by adding the specific margin to the recommended minimum speed or the minimum speed limit, as a speed limit.

In this case, illustratively, the processor 220 be configured to may obtain information about the recommended minimum speed or the minimum speed limit of the road where the autonomous vehicle may be currently traveling, based on the navigation map information.

Illustratively, when the recommended minimum speed or the minimum speed limit of the road where the autonomous vehicle may be traveling may be 60 km/h, the speed limit may be 65 km/h when the specific margin may be 5 km/h, and the speed limit may be 70 km/h when the specific margin may be 10 km/h.

As an example, the processor 220 may be configured to determine the speed limit as a speed higher than the calculated average speed, with regard to a predetermined minimum unit.

Although the calculated average speed may be determined as the speed limit, it may not be impossible. However, when the calculated average speed may be determined as the speed limit, because the speed of the autonomous vehicle may be able to be rapidly lowered and when it may be able to cause cognitive confusion for a user, the processor 220 may determine a speed higher than the calculated average speed as a speed limit.

As an example, the processor 220 may be configured to determine a speed, which may be an integer multiple of the predetermined minimum unit, as a speed limit.

Illustratively, when the predetermined minimum unit may be 10 km/h and when the calculated average speed may be 81 km/h, the processor 220 may determine the speed limit as 90 km/h.

As an example, the processor 220 may calculate a speed limit as a speed at which a speed deviation of the autonomous vehicle may be predicted to be lowest in a process where autonomous driving may be performed while a transition demand (TD) may be output.

As an example, the processor 220 may be configured to predict a speed deviation of the autonomous vehicle according to the speed limit in the process where the autonomous vehicle may be performed while the TD may be output, based on shape information of a road where the autonomous vehicle may be traveling and speed information about surrounding traffic flow.

As an example, the processor 220 may be configured to calculate a speed profile of the autonomous vehicle, which may be expected in the process where the autonomous vehicle while the TD may be output, based on the shape information of the road where the autonomous vehicle may be traveling and the speed information about the surrounding traffic flow.

As an example, the processor 220 may be configured to calculate an average speed while the TD may be output, based on the calculated speed profile.

As an example, the processor 220 may be configured to calculate a speed limit allowing a value in which a deviation with the average speed may be accumulated to be minimum while the TD may be output, based on the calculated speed profile.

As an example, the processor 220 may be configured to detect a current weather state or a state of the road where the autonomous vehicle may be traveling and may calculate a speed limit, based on an experience model according to the detected weather state or the detected state of the road.

As an example, the processor 220 may be configured to obtain information about current weather by means of the AVN of the autonomous vehicle. The weather state may include information about whether the current weather may be in a state determined as inclement weather.

As an example, the processor 220 may be configured to detect a state of the road by means of a sensor provided in the autonomous vehicle or through communication with the outside. The state of the road may include information about a road surface state of the road or the degree of slipperiness of the road.

As an example, the processor 220 may be configured to calculate a distance determined that the autonomous vehicle may be able to travel sufficiently safely, based on the experience model according to the weather state or the state of the road.

The experience model according to the weather state or the state of the road may be generated experientially and may refer to a function of calculating a distance determined that the autonomous vehicle may be able to travel sufficiently safely, according to a value corresponding to the weather state or the state of the road.

As an example, the processor 220 may be configured to determine a speed, which may be obtained by dividing the distance determined that the autonomous vehicle may be able to travel sufficiently safely, by a time when a TD may be output (or a TD time), as a speed limit.

As an example, the processor 220 may be configured to determine whether a breakdown in the autonomous vehicle occurs. When it may be determined that the breakdown in the autonomous vehicle occurs, the processor 220 may be configured to calculate a speed limit, based on an experience model according to a breakdown situation of the autonomous vehicle.

As an example, the processor 220 be configured to may calculate a distance determined that the autonomous vehicle may be able to travel sufficiently safely, based on the experience model according to the breakdown situation.

The experience model according to the breakdown situation may be generated experientially and may refer to a function of calculating a distance determined that the autonomous vehicle may be able to travel sufficiently safely, according to a value corresponding to the breakdown situation.

As an example, the processor 220 may be configured to determine a speed, which may be obtained by dividing the distance determined that the autonomous vehicle may be able to travel sufficiently safely by a time when a TD may be output (or a TD time), as a speed limit.

The processor 220 may be provided in the autonomous vehicle to determine whether a predetermined condition required to transition to a manual driving mode while the autonomous vehicle may be traveling in an autonomous driving mode may be met.

As an example, the processor 220 may be configured to detect a specific event point in front of the autonomous vehicle. When the autonomous vehicle arrives at a point spaced apart from the specific event point at a specific distance, the processor 220 may be configured to determine that the predetermined condition may be met.

Herein, the specific event point may include a point where the autonomous vehicle starts to deviate from an operational design domain (ODD) or a point determined that it may be impossible for the autonomous vehicle to perform autonomous driving.

As an example, the processor 220 may be configured to detect that the specific event point may be present in front of the autonomous vehicle by means of the navigation map information.

As an example, the processor 220 may be configured to calculate a distance, which may be obtained by adding a predetermined margin to a distance needed until the autonomous vehicle may be stopped by a minimum risk maneuver (MRM) after the autonomous vehicle travels at the calculated average speed during a predetermined specific time, as the specific distance.

The MRM may include driving through a driving strategy such as a strategy where the autonomous vehicle decelerates and stops on the lane by autonomous driving or a strategy where the autonomous vehicle makes a lane change to a shoulder to decelerate and stop by autonomous driving.

The MRM may be performed, when an airbag of the autonomous vehicle may be operated, when the breakdown in the autonomous vehicle or a system included in the autonomous vehicle occurs, and when the TD may be ended because a user does not take over control authority of the autonomous vehicle after the TD occurs during autonomous driving of the autonomous vehicle.

When the predetermined condition may be met, the processor 220 may be configured to output a TD to the driver of the autonomous vehicle.

As an example, the processor 220 may be configured to output a TD to the driver using a visual signal or an audible signal by means of AVN, a head-up display (HUD), or a cluster.

The processor 220 may be configured to control autonomous driving such that the speed of the autonomous vehicle may not be greater than the speed limit while the TD may be output.

The autonomous driving control apparatus 200 may further include a sensor device 222 provided in the autonomous vehicle to sense a speed of a surrounding vehicle.

As an example, the sensor device 222 may include at least one of a camera, a radar, or a light detection and ranging (LiDAR).

As an example, the processor 220 may be configured to calculate an average speed of the surrounding vehicle during a specific time, based on the speed of the surrounding vehicle, may determine whether the speed limit may be lower than the calculated average speed of the surrounding vehicle over a specific reference value, and may fail to output a TD to the driver of the autonomous vehicle and may perform an MRM, when it may be determined that the speed limit may be lower than the calculated average speed of the surrounding vehicle over the specific reference value.

As an example, when the speed limit may be lower than the calculated average speed of the surrounding vehicle over the specific reference value, the processor 220 may be configured to determine that it may be impossible for the autonomous vehicle to travel during a TD time and may immediately transition the autonomous driving mode to an MRM mode.

Figure 3:
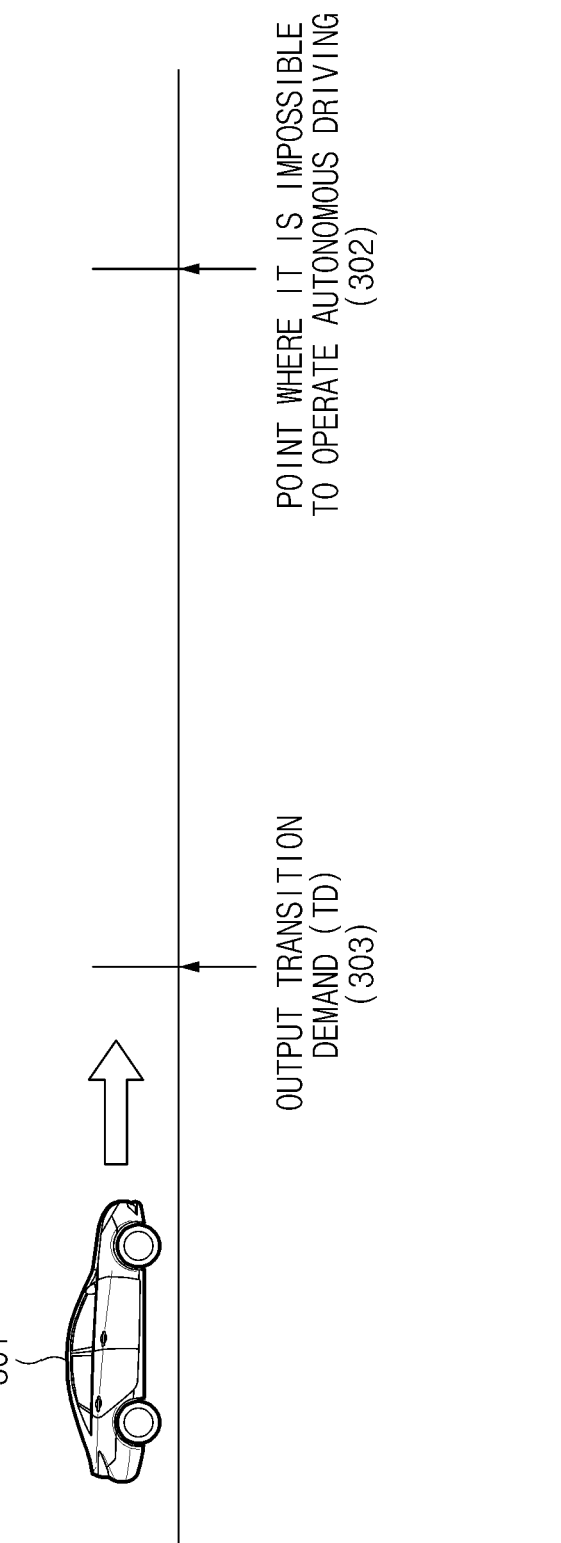
FIG. 3 is a drawing illustrating that an autonomous driving control apparatus outputs a transition demand (TD) according to an embodiment of the present disclosure.

FIG. 3 is a drawing illustrating that an autonomous driving control apparatus outputs a transition demand (TD) according to an embodiment of the present disclosure.

Referring to FIG. 3, the autonomous driving control apparatus may determine whether a point 302 where it may be impossible to operate autonomous driving may be present in front of an expected driving route of an autonomous vehicle 301.

As an example, the autonomous driving control apparatus may determine whether the point 302 where it may be impossible to operate the autonomous driving may be present in front of the expected driving route of the autonomous vehicle 301, by means of navigation map information.

As an example, the point 302 where it may be impossible to operate the autonomous driving may include a point where the autonomous vehicle 301 starts to deviate from an ODD, for example, a tollgate entry point, a junction (JC), an interchange (IC), or an entry/exit point.

When it may be determined that the point 302 where it may be impossible to operate the autonomous driving may be present in front of the expected driving route of the autonomous vehicle 301, the autonomous driving control apparatus may output a signal for requesting to transition control authority from an autonomous driving system to the driver at a point 303 spaced apart from the point 302 where it may be impossible to operate the autonomous driving at a specific distance.

The signal for requesting to transition the control authority may include a visual and/or audible notification.

As an example, the autonomous driving control apparatus may determine a specific distance based on an average speed of the autonomous vehicle 301 during a recent specific time.

As an example, the autonomous driving may calculate a distance, which may be obtained by adding a predetermined margin to a distance needed until the autonomous vehicle may be stopped by means of an MRM after the autonomous vehicle travels at the calculated average speed during a predetermined specific time, as the specific distance.

The autonomous driving control apparatus may control an autonomous driving speed of the autonomous vehicle 301 not to be greater than a speed limit while a TD may be output, thus performing autonomous driving.

Figure 4:
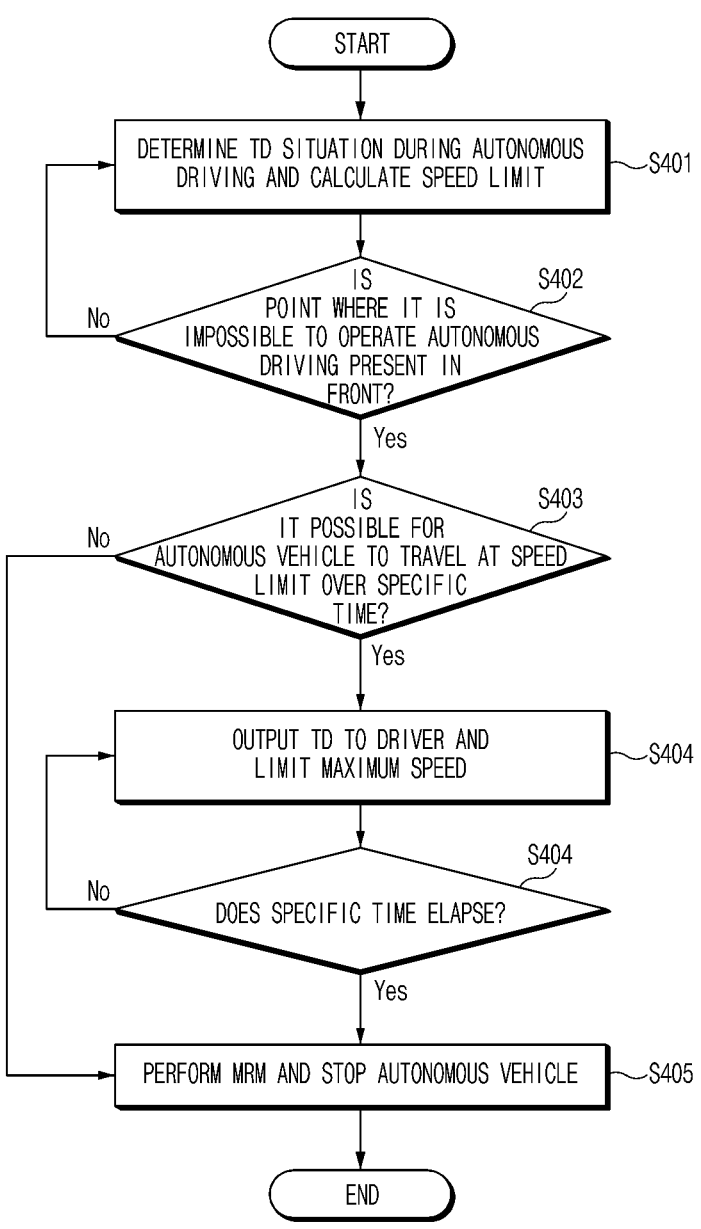
FIG. 4 is a flowchart illustrating an operation of an autonomous driving control apparatus according to an embodiment of the present disclosure.

FIG. 4 is a flowchart illustrating an operation of an autonomous driving control apparatus according to an embodiment of the present disclosure.

Hereinafter, it may be assumed that an autonomous driving control apparatus 200 of FIG. 2 performs a process of FIG. 4. Furthermore, in a description of FIG. 4, an operation described as being performed by an autonomous driving control apparatus may be understood as being controlled by a processor 220 of an autonomous driving control apparatus 200.

Referring to FIG. 4, in S401, the autonomous driving control apparatus may determine a TD situation during autonomous driving and may calculate a speed limit.

As an example, when there is autonomous driving release manipulation while determining the TD situation and the calculating the speed limit, the autonomous driving control apparatus may transition an autonomous driving mode to a manual driving mode.

As an example, the autonomous driving release manipulation may include that an autonomous driving release switch is input or that the driver manipulates a steering wheel, an accelerator pedal, or a brake pedal over a predetermined specific level.

In S402, the autonomous driving control apparatus may identify whether a point where it is impossible to operate autonomous driving is present in front of an autonomous vehicle.

When it is identified that the point where it is impossible to operate the autonomous driving is not present in front of the autonomous vehicle, the autonomous driving control apparatus may return to S401 to determine a TD situation and calculate a speed limit.

When it is identified that the point where it is impossible to operate the autonomous driving is present in front of the autonomous vehicle, in S403, the autonomous driving control apparatus may identify whether it is possible for the autonomous vehicle to travel at the speed limit over a specific time.

Herein, the specific time may be preset to a time suitable for the driver to take over control authority after the TD is output.

When it is identified that it is not possible for the autonomous vehicle to travel at the speed limit over the specific time, in S406, the autonomous driving control apparatus may perform an MRM and may stop the autonomous vehicle.

When it is identified that it is possible for the autonomous vehicle to travel at the speed limit over the specific time, in S404, the autonomous driving control apparatus may output a TD and may limit a maximum speed.

In S405, the autonomous driving control apparatus may identify whether a specific time elapses.

When the specific time elapses, in S406, the autonomous driving control apparatus may perform an MRM and may stop the autonomous vehicle.

Figure 5:
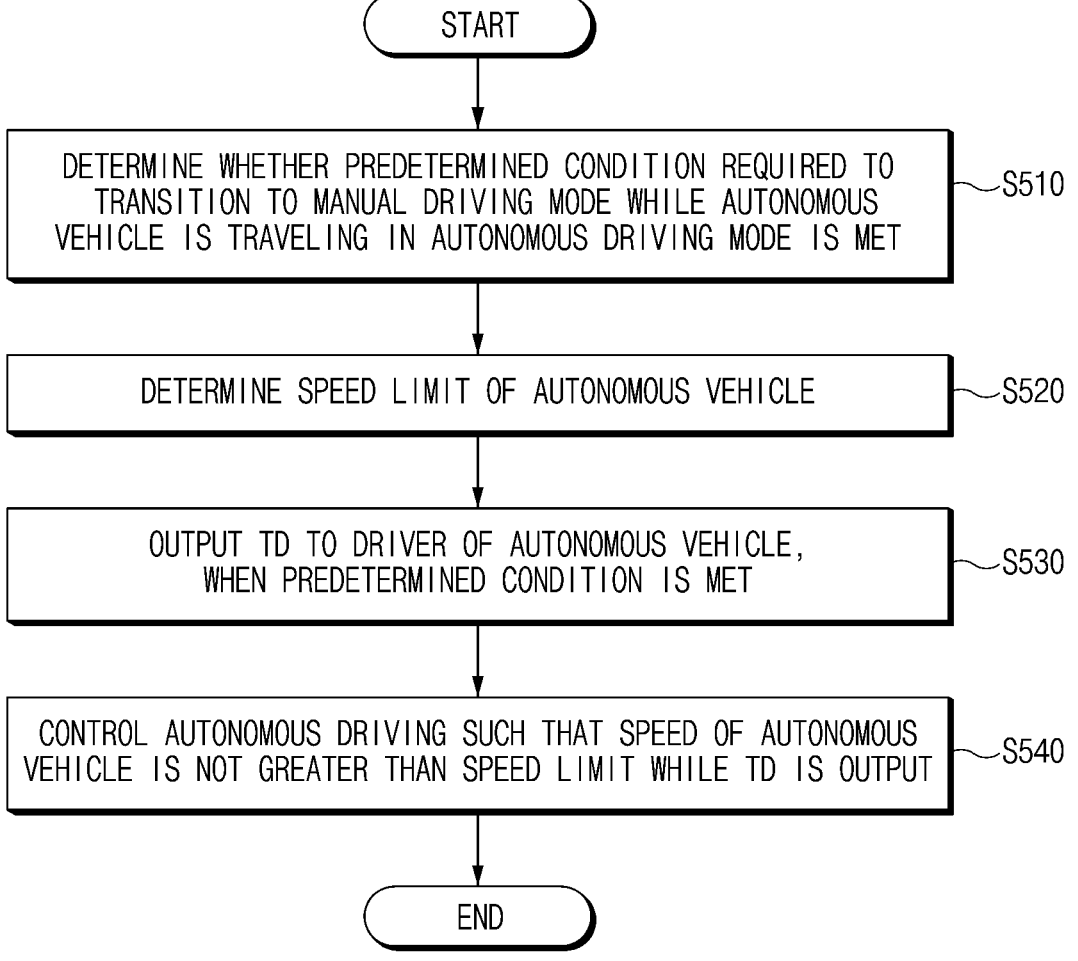
FIG. 5 is a flowchart illustrating an autonomous driving control method according to an embodiment of the present disclosure.

FIG. 5 is a flowchart illustrating an autonomous driving control method according to an embodiment of the present disclosure.

Referring to FIG. 5, the autonomous driving control method may include determining (S510) whether a predetermined condition required to transition to a manual driving mode while an autonomous vehicle is traveling in an autonomous driving mode is met, determining (S520) a speed limit of the autonomous vehicle, outputting (S530) a transition demand (TD) to a driver of the autonomous vehicle, when the predetermined condition is met, and controlling (S540) autonomous driving such that a speed of the autonomous vehicle is not greater than the speed limit while the TD is output.

It is illustrated that S510, S520, S530, and S540 are performed in order, but, according to an embodiment, S520 may be performed at the same time as S510 and S530 and S540 may be performed at the same time.

The determining (S510) of whether the predetermined condition required to transition to the manual driving mode while the autonomous vehicle is traveling in the autonomous driving mode may be performed by a processor provided in the autonomous vehicle.

As an example, the determining (S510) of whether the predetermined condition required to transition to the manual driving mode while the autonomous vehicle is traveling in the autonomous driving mode may include detecting, by the processor, a specific event point in front of the autonomous vehicle and determining, by the processor, that the predetermined condition is met, when the autonomous vehicle arrives at a point spaced apart from the specific event point at a specific distance.

As an example, the determining that the predetermined condition is met by the processor, when the autonomous vehicle arrives at the point spaced apart from the specific event point at the specific distance, may include calculating, by the processor, a distance, which is obtained by adding a predetermined margin to a distance needed until the autonomous vehicle is stopped by means a minimum risk maneuver (MRM) after traveling at a calculated average speed during a predetermined specific time, as the specific distance.

The determining (S520) of the speed limit of the autonomous vehicle may be performed by the processor provided the autonomous vehicle.

As an example, the determining (S520) of the speed limit of the autonomous vehicle may include determining, by the processor, the speed limit, based on a maximum speed limit corresponding to a road where the autonomous vehicle is traveling.

As an example, the determining (S520) of the speed limit of the autonomous vehicle may include determining, by the processor, the speed limit, based on a target speed received from a driver.

As an example, the determining (S520) of the speed limit of the autonomous vehicle may include calculating, by the processor, an average speed of the autonomous vehicle during a specific time and determining, by the processor, the speed limit, based on the calculated average speed.

As an example, the determining (S520) of the speed limit of the autonomous vehicle may include determining, by the processor, the speed limit, as a speed higher than the calculated average speed, with regard to a predetermined minimum unit.

As an example, the determining (S520) of the speed limit of the autonomous vehicle may include calculating, by the processor, the speed limit as a speed at which a speed deviation of the autonomous vehicle is predicted to be lowest in a process where autonomous driving is performed while a TD is output.

As an example, the determining (S520) of the speed limit of the autonomous vehicle may include determining, by the processor, a speed, which is obtained by adding a specific margin to a recommended minimum speed or a minimum speed limit corresponding to the road where the autonomous vehicle is traveling, as the speed limit, when the calculated average speed is lower than the recommended minimum speed or the minimum speed limit.

As an example, the determining (S520) of the speed limit of the autonomous vehicle may include detecting, by the processor, a current weather state or a state of the road where the autonomous vehicle is traveling and calculating the speed limit, based on an experience model according to the detected weather state or the detected state of the road.

As an example, the determining (S520) of the speed limit of the autonomous vehicle may include determining, by the processor, whether a breakdown in the autonomous vehicle occurs, and calculating, by the processor, the speed limit, based on an experience model according to a breakdown situation of the autonomous vehicle, when it is determined that the breakdown in the autonomous vehicle occurs.

The outputting (S530) of the TD to the driver of the autonomous vehicle, when the predetermined condition is met, may be performed by the processor provided in the autonomous vehicle.

The controlling (S540) of the autonomous driving such that the speed of the autonomous vehicle is not greater than the speed limit while the TD is output may be performed by the processor provided in the autonomous vehicle.

As an example, the autonomous driving control method may further include sensing, by a sensor device provided in the autonomous vehicle, a speed of a surrounding vehicle, calculating, by the processor, an average speed of the surrounding vehicle during a specific time, based on the speed of the surrounding vehicle, determining, by the processor, whether the speed limit is lower than the calculated average speed of the surrounding vehicle over a specific reference value, and not outputting, by the processor, a TD to the driver of the autonomous vehicle and performing, by the processor, an MRM, when it is determined that the speed limit is lower than the calculated average speed of the surrounding vehicle over the specific reference value.

Figure 6:
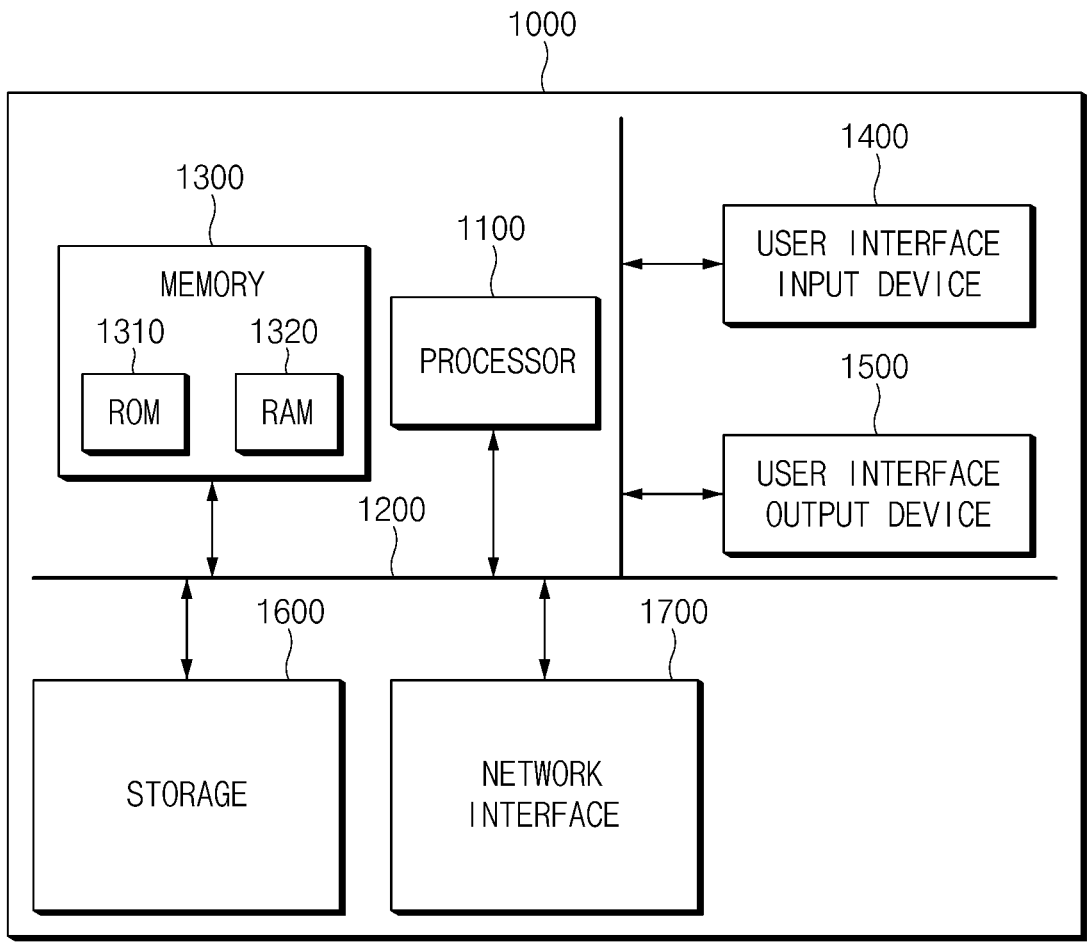
FIG. 6 is a block diagram illustrating a computing system according to an embodiment of the present disclosure.

FIG. 6 is a block diagram illustrating a computing system according to an embodiment of the present disclosure.

Referring to FIG. 6, a computing system 1000 may include at least one processor 1100, a memory 1300, a user interface input device 1400, a user interface output device 1500, a storage 1600, and a network interface 1700, which may be connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a read only memory (ROM) 1310 and a random access memory (RAM) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disc, a removable disk, and a CD-ROM.

The exemplary storage medium may be coupled to the processor 1100. The processor 1100 may read out information from the storage medium and may write information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

A description will be given of effects of the autonomous driving control apparatus and the method thereof according to an embodiment of the present disclosure.

According to at least one of embodiments of the present disclosure, the autonomous driving control apparatus and the method thereof may be provided to transition control authority of an autonomous vehicle.

Furthermore, according to at least one of embodiments of the present disclosure, the autonomous driving control apparatus and the method thereof may be provided to sufficiently ensure a time taken to transition control authority to the driver, thus improving safety.

Furthermore, according to at least one of embodiments of the present disclosure, the autonomous driving control apparatus and the method thereof may be provided to perform a minimum risk maneuver (MRM) to stop the vehicle, when the time taken to transition the control authority to the driver may not be sufficiently ensured, thus securing autonomous driving safety.

Furthermore, according to at least one of embodiments of the present disclosure, the autonomous driving control apparatus and the method thereof may be provided to set a speed limit suitable for a driving situation and sufficiently ensure a time taken to transition control authority to the driver.

Furthermore, according to at least one of embodiments of the present disclosure, the autonomous driving control apparatus and the method thereof may be provided to improve the safety and convenience of an autonomous driving system.

In addition, various effects ascertained directly or indirectly through the present disclosure may be provided.

Hereinabove, although the present disclosure has been described with reference to exemplary embodiments and the accompanying drawings, the present disclosure may not be limited thereto, but may be variously modified and altered by those skilled in the art to which the present disclosure pertains without departing from the spirit and scope of the present disclosure claimed in the following claims.

Therefore, embodiments of the present disclosure may not be intended to limit the technical spirit of the present disclosure, but provided only for the illustrative purpose. The scope of the present disclosure should be construed on the basis of the accompanying claims, and all the technical ideas within the scope equivalent to the claims should be included in the scope of the present disclosure.

What is claimed is:

1. An autonomous driving control apparatus, comprising:
a processor;
a memory storing instructions executable by the processor, wherein the instructions when executed by the processor are configured to:
determine whether a predetermined condition required to transition to a manual driving mode while the autonomous vehicle is traveling in an autonomous driving mode is met,
calculate an average speed of the autonomous vehicle during a specific time,
determine a speed limit of the autonomous vehicle based on the calculated average speed,
output a transition demand (TD) when the predetermined condition is met, and
control autonomous driving by managing a speed of the autonomous vehicle to not be greater than the speed limit while the TD is output; and
a sensor device provided in the autonomous vehicle and configured to sense a speed of a surrounding vehicle,
wherein the processor is configured through the instructions to calculate an average speed of the surrounding vehicle during a specific time, based on the speed of the surrounding vehicle, determine whether the speed limit is lower than the calculated average speed of the surrounding vehicle over a specific reference value, and does not output the TD and performs an MRM, when the processor through the instructions determined that the speed limit is lower than the calculated average speed of the surrounding vehicle over the specific reference value.

2. The autonomous driving control apparatus of claim 1, wherein the processor is configured through the instructions to determine the speed limit based on a maximum speed limit corresponding to a road where the autonomous vehicle is traveling.

3. The autonomous driving control apparatus of claim 1, wherein the processor is configured through the instructions to determine the speed limit based on a target speed received from a user.

4. The autonomous driving control apparatus of claim 1, wherein the processor is configured through the instructions to detect a specific event point in front of the autonomous vehicle and determine that the predetermined condition is met, when the autonomous vehicle arrives at a point spaced apart from the specific event point at a specific distance.

5. The autonomous driving control apparatus of claim 4, wherein the processor is configured through the instructions to calculate a distance, which is obtained by adding a predetermined margin to a distance needed until the autonomous vehicle is stopped by a minimum risk maneuver (MRM) after the autonomous vehicle travels at the calculated average speed during a predetermined specific time, as the specific distance.

6. The autonomous driving control apparatus of claim 1, wherein the processor is configured through the instructions to determine a speed, which is obtained by adding a specific margin to a recommended minimum speed or a minimum speed limit corresponding to a road where the autonomous vehicle is traveling, as the speed limit, when the calculated average speed is lower than the recommended minimum speed or the minimum speed limit.

7. The autonomous driving control apparatus of claim 1, wherein the processor is configured through the instructions to determine the speed limit as a speed higher than the calculated average speed, with regard to a predetermined minimum unit.

8. The autonomous driving control apparatus of claim 1, wherein the processor is configured through the instructions to calculate the speed limit as a speed at which a speed deviation of the autonomous vehicle is predicted to be lowest in a process where the autonomous driving is performed while the TD is output.

9. The autonomous driving control apparatus of claim 1, wherein the processor is configured through the instructions to detect a current weather state or a state of a road where the autonomous vehicle is traveling and calculate the speed limit, based on an experience model according to the detected weather state or the detected state of the road.

10. The autonomous driving control apparatus of claim 1, wherein the processor is configured through the instructions to determine whether a breakdown in the autonomous vehicle occurs and calculates the speed limit, based on an experience model according to a breakdown situation of the autonomous vehicle, when it is determined that the breakdown in the autonomous vehicle occurs.

11. An autonomous driving control method, comprising:
   determining, by a processor provided in an autonomous vehicle, whether a predetermined condition required to transition to a manual driving mode while the autonomous vehicle is traveling in an autonomous driving mode is met;
   determining, by the processor, a speed limit of the autonomous vehicle;
   outputting, by the processor, a TD when the predetermined condition is met; and
   controlling, by the processor, autonomous driving such that a speed of the autonomous vehicle is not greater than the speed limit while the TD is output;
   wherein the determining of the speed limit of the autonomous vehicle by the processor includes:
      calculating, by the processor, an average speed of the autonomous vehicle during a specific time; and
      determining, by the processor, the speed limit, based on the calculated average speed;
   sensing, with a sensor device provided in the autonomous vehicle, a speed of a surrounding vehicle;
   calculating, by the processor, an average speed of the surrounding vehicle during a specific time, based on the speed of the surrounding vehicle;
   determining, by the processor, whether the speed limit is lower than the calculated average speed of the surrounding vehicle over a specific reference value; and
   not outputting by the processor, the TD to a user of the autonomous vehicle and performing by the processor, an MRM, when the speed limit is lower than the calculated average speed of the surrounding vehicle over the specific reference value as determined by the processor.

12. The autonomous driving control method of claim 11, wherein the determining of whether the predetermined condition is met by the processor includes:
   detecting, by the processor, a specific event point in front of the autonomous vehicle; and
   determining, by the processor, that the predetermined condition is met, when the autonomous vehicle arrives at a point spaced apart from the specific event point at a specific distance.

13. The autonomous driving control method of claim 12, wherein the determining that the predetermined condition is met, when the autonomous vehicle arrives at the point spaced apart from the specific event point at the specific distance by the processor includes:
   calculating, by the processor, a distance, which is obtained by adding a predetermined margin to a distance needed until the autonomous vehicle is stopped by means of an MRM after the autonomous vehicle travels at the calculated average speed during a predetermined specific time, as the specific distance.

14. The autonomous driving control method of claim 11, wherein the determining of the speed limit of the autonomous vehicle by the processor includes:
   determining, by the processor, a speed, which is obtained by adding a specific margin to a recommended minimum speed or a minimum speed limit corresponding to a road where the autonomous vehicle is traveling, as the speed limit, when the calculated average speed is lower than the recommended minimum speed or the minimum speed limit.

15. The autonomous driving control method of claim 13, wherein the determining of the speed limit of the autonomous vehicle by the processor includes:
   detecting, by the processor, a current weather state or a state of a road where the autonomous vehicle is traveling; and
   calculating, by the processor, the speed limit, based on an experience model according to the detected weather state or the detected state of the road.

16. The autonomous driving control method of claim 11, wherein the determining of the speed limit of the autonomous vehicle by the processor includes:
   determining, by the processor, whether a breakdown in the autonomous vehicle occurs; and
   calculating, by the processor, the speed limit, based on an experience model according to a breakdown situation of the autonomous vehicle, when it is determined that the breakdown in the autonomous vehicle occurs.

* * * * *